US007648156B2

(12) United States Patent
Johanson

(10) Patent No.: US 7,648,156 B2
(45) Date of Patent: Jan. 19, 2010

(54) DUAL MODE WHEELCHAIR

(75) Inventor: Colin Johanson, Williamstown (AU)

(73) Assignee: Johanson Nominees Pty Ltd, Williamstown, Victoria (AU)

( * ) Notice: Subject to any disclaimer, the term of this patent is extended or adjusted under 35 U.S.C. 154(b) by 338 days.

(21) Appl. No.: 11/573,213

(22) PCT Filed: Aug. 4, 2005

(86) PCT No.: PCT/AU2005/001168

§ 371 (c)(1),
(2), (4) Date: Feb. 5, 2007

(87) PCT Pub. No.: WO2006/012699

PCT Pub. Date: Feb. 9, 2006

(65) Prior Publication Data

US 2008/0054596 A1 Mar. 6, 2008

(30) Foreign Application Priority Data

Aug. 4, 2004 (AU) .............................. 2004904400

(51) Int. Cl.
*B62B 3/02* (2006.01)

(52) U.S. Cl. ....................... 280/657; 280/638; 180/209; 180/907

(58) Field of Classification Search ................. 280/638, 280/657, 304.1, 149.2; 180/208, 907, 908, 180/209
See application file for complete search history.

(56) References Cited

U.S. PATENT DOCUMENTS

| | | | | |
|---|---|---|---|---|
| 4,825,971 | A * | 5/1989 | Bernstein | 180/65.1 |
| 5,011,175 | A * | 4/1991 | Nicholson et al. | 280/304.1 |
| 6,428,029 | B1 | 8/2002 | Barclay | |
| 6,530,445 | B1 * | 3/2003 | Flowers et al. | 180/208 |
| 7,100,718 | B2 * | 9/2006 | Bancroft | 180/65.1 |
| 7,278,653 | B2 * | 10/2007 | Pelke et al. | 280/650 |
| 7,341,121 | B2 * | 3/2008 | Flowers et al. | 180/6.66 |
| 2003/0205883 | A1 * | 11/2003 | Bergstrom et al. | 280/304.1 |

FOREIGN PATENT DOCUMENTS

| | | | |
|---|---|---|---|
| GB | 2141980 | A | 1/1985 |
| GB | 2201588 | A | 9/1988 |
| WO | 9639320 | A1 | 12/1996 |
| WO | 2004030596 | A1 | 5/2004 |

* cited by examiner

*Primary Examiner*—Lesley Morris
*Assistant Examiner*—John D Walters
(74) *Attorney, Agent, or Firm*—Richard M. Goldberg

(57) ABSTRACT

A dual mode wheelchair (300) providing both a maneuverable indoor mode and a travel mode. The wheelchair (300) comprises fore wheels (104) mounted on a fore axis (105) and rear wheels (102) mounted on a rear axis (103). A distance between the fore axis (105) and the rear axis (103) defines a wheelbase of the wheelchair (300). The wheelbase is alterable between a short wheelbase providing a maneuverable mode of the wheelchair (300) and a long wheelbase providing a travel mode of the wheelchair (300). The wheelchair (300) further provides a lowered center of gravity and a reclining position in the travel mode to provide improved stability and occupant security.

15 Claims, 5 Drawing Sheets

DUAL MODE WHEELCHAIR

CROSS-REFERENCE TO RELATED APPLICATIONS

The present application claims priority from Provisional Patent Application No. 2004904400 filed on 4 Aug. 2004, the content of which is incorporated herein by reference.

FIELD OF THE INVENTION

The present invention relates to wheelchairs, and in particular to a dual mode wheelchair having a manoeuvrable mode and a travel mode.

BACKGROUND OF THE INVENTION

A wide range of wheelchairs are currently available, each type of wheelchair having characteristics which make it suitable for a given application. One type of wheelchair, commonly referred to as an indoor chair, has a seat arranged to place the occupant in an upright seated position, for instance to enable the occupant to eat at a dining table, or work at an office desk or use a computer. The indoor chair, being used in confined indoor environments such as offices and homes, must have dimensions to enable the chair to negotiate doorways, corridors, and tight indoor spaces. Consequently, the wheelbase of such indoor chairs, being the distance between a front wheel axis and a rear wheel axis, is made short to provide a manoeuvrable wheelchair which can be turned within a small floor space. However, such a short wheelbase leads to directional instability should such a wheelchair be used at speed, and so manoeuvrable wheelchairs are unsuited for travel over distance.

A second type of wheelchair, commonly referred to as an outdoor wheelchair or a travel wheelchair, has a wheelbase which is significantly longer than that of manoeuvrable wheelchairs, in order to avoid or minimise the directional instability associated with short wheelbase wheelchairs used at speed. Consequently, travel wheelchairs require a large footprint for turning which makes them unsuitable for use in confined indoor environments. Further, travel wheelchairs have a seat arranged to place the occupant in an upright seated position, such a posture being required at the destination. Some travel wheelchairs provide for the seat to be set to a user-selected partially reclined position upon delivery. Further travel wheelchairs provide for reclining positions to be selected or altered during use, however such chairs raise the occupant's centre of gravity during such reclining, thus decreasing the stability of the wheelchair at speed or on uneven ground.

With these and other wheelchairs being applicable to only a subset of activities undertaken by a user, many wheelchair users obtain more than one wheelchair so that a suitable wheelchair is available for each situation encountered by the user in day to day use. Consequently, wheelchair users are faced with the costs of obtaining and maintaining multiple wheelchairs, the need for the user to regularly transfer from one wheelchair to another, and the burden of carrying those unused wheelchairs with them for future use.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to a first aspect, the present invention provides a dual mode wheelchair comprising:

at least one fore wheel mounted on a fore axis and at least one rear wheel mounted on a rear axis, a distance between the fore axis and the rear axis defining a wheelbase of the wheelchair;

wherein the wheelbase is alterable between a short wheelbase providing a manoeuvrable mode of the wheelchair and a long wheelbase providing a travel mode of the wheelchair.

According to a second aspect the present invention provides a dual mode wheelchair comprising:

at least one fore wheel mounted on a fore axis and at least one rear wheel mounted on a rear axis, a distance between the fore axis and the rear axis defining a wheelbase of the wheelchair;

wherein the wheelbase is alterable between a short wheelbase providing a manoeuvrable mode of the wheelchair and a long wheelbase providing a travel mode of the wheelchair;

and wherein a centre of gravity of the wheelchair when occupied in the manoeuvrable mode is higher than a centre of gravity of the wheelchair when occupied in the travel mode.

In preferred embodiments of the invention, in the short wheelbase manoeuvrable mode the wheelbase may be less than substantially 45 centimeters, and more preferably may be less than substantially 40 centimeters. In preferred embodiments of the invention, in the long wheelbase travel mode the wheelbase may be greater than substantially 55 centimeters, and more preferably may be greater than substantially 60 centimeters.

In preferred embodiments of the invention the wheelchair provides a reclined seating position in the travel mode, and an upright seating position in the manoeuvrable mode. In such embodiments, in the travel mode the wheelchair is preferably arranged to provide a centre of gravity of the occupant at a smaller distance off the ground than when in the manoeuvrable mode. Such embodiments thus reduce the likelihood of the chair overturning or the occupant being thrown forward during braking or laterally from the chair during cornering or travel over uneven ground in the travel mode.

Preferred embodiments of the invention may provide for operation of the wheelchair at one or more intermediate positions between the manoeuvrable mode and the travel mode, thus providing the option of intermediate set-points providing gradually varying amounts of recline and wheelbase extension.

The dual mode wheelchair may comprise a sub-frame upon which the at least one rear wheel is mounted, and a seat frame upon which the at least one fore wheel is mounted. In such embodiments, the seat frame is preferably movably mounted to the sub-frame to provide for alteration of the wheelbase between the two modes. The movable mounting of the seat frame to the sub-frame may comprise a sliding mount, wherein the seat frame is slidable relative to the sub-frame to provide for alteration of the wheelbase between the manoeuvrable mode and the travel mode. A sliding mount attachment of the seat frame is preferably proximal to a rear of the seat frame, and the sliding mount preferably provides for the sliding mount attachment of the seat frame to travel forwardly and downwardly when the wheelbase is lengthened from the manoeuvrable mode to the travel mode. Such embodiments provide for a centre of gravity of the wheelchair to be lower when in the travel mode than a centre of gravity of the wheelchair when in the manoeuvrable mode. Such embodiments further provide for the rear of the seat frame to be moved lower relative to a fore portion of the seat frame when in the travel mode, thus providing for a reclined seating position of the wheelchair in the travel mode.

Movement of the sliding mount attachment of the seat frame along the sliding mount may be actuated by a motor. For example an electric motor may drive the sliding mount attachment along the sliding mount. Alternatively the movable mount between the seat frame and the sub-frame may be actuated manually, for example by way of a hand-operated threaded winding mechanism.

In alternate embodiments, the seat frame may be movably mounted to the sub-frame by at least one pivot arm, the at least one pivot arm adapted to stand upright when in the manoeuvrable mode, and adapted to extend forwardly when in the travel mode, such that a height of the seat frame is less when in the travel mode.

The rear wheels may be drive wheels of large diameter to enable an occupant to grasp the drive wheels or appended hand rails. The dual mode wheelchair may comprise a motor to drive the drive wheels.

At least one guide wheel may be provided rearward of the rear wheels in order to counteract backwards tipping of the wheelchair. Preferably one guide wheel is provided, which is preferably positioned substantially centrally between the sides of the wheelchair. Such embodiments provide for a guide wheel to be positioned a sufficient distance rearward of the rear wheels to counteract tipping of the wheelchair to the rear, while retaining the ability for the wheelchair to manoeuvre within a small area.

The at least one guide wheel may be a castor.

In embodiments comprising at least one guide wheel provided rearward of the rear wheels, the wheelchair is preferably articulated in order to retain all wheels in contact with the ground over uneven terrain. Such articulation may be effected by the movable mount between the sub-frame and the seat frame.

The at least one fore wheel may be a castor.

According to a third aspect the present invention provides a dual mode wheelchair frame comprising:

a first frame portion for mounting at least one fore wheel on a fore axis; and a second frame portion for mounting at least one rear wheel on a rear axis, a distance between the fore axis and the rear axis defining a wheelbase of the dual mode wheelchair frame;

wherein the first frame portion is movably mounted to the second frame portion to provide for alteration between a short wheelbase providing a manoeuvrable mode of the wheelchair frame and a long wheelbase providing a travel mode of the wheelchair frame.

According to a fourth aspect the present invention provides a dual mode wheelchair frame comprising:

a first frame portion for mounting at least one fore wheel on a fore axis; and a second frame portion for mounting at least one rear wheel on a rear axis, a distance between the fore axis and the rear axis defining a wheelbase of the dual mode wheelchair frame;

wherein the first frame portion is movably mounted to the second frame portion to provide for alteration between a short wheelbase providing a manoeuvrable mode of the wheelchair frame and a long wheelbase providing a travel mode of the wheelchair frame;

and wherein a centre of gravity of the wheelchair frame when occupied in the manoeuvrable mode is higher than a centre of gravity of the wheelchair frame when occupied in the travel mode.

According to a fifth aspect the present invention provides a method of constructing a dual mode wheelchair, the method comprising:

providing at least one fore wheel mounted on a fore axis; and providing at least one rear wheel mounted on a rear axis, a distance between the fore axis and the rear axis defining a wheelbase of the wheelchair;

wherein the wheelbase is alterable between a short wheelbase providing a manoeuvrable mode of the wheelchair and a long wheelbase providing a travel mode of the wheelchair.

According to a sixth aspect the present invention provides a method of constructing a dual mode wheelchair, the method comprising:

providing at least one fore wheel mounted on a fore axis; and providing at least one rear wheel mounted on a rear axis, a distance between the fore axis and the rear axis defining a wheelbase of the wheelchair;

wherein the wheelbase is alterable between a short wheelbase providing a manoeuvrable mode of the wheelchair and a long wheelbase providing a travel mode of the wheelchair;

and wherein a centre of gravity of the wheelchair when occupied in the manoeuvrable mode is higher than a centre of gravity of the wheelchair when occupied in the travel mode.

BRIEF DESCRIPTION OF THE DRAWINGS

Examples of the invention will now be described with reference to the accompanying drawings in which.

DETAILED DESCRIPTION OF THE PREFERRED EMBODIMENTS

Figure 1A:
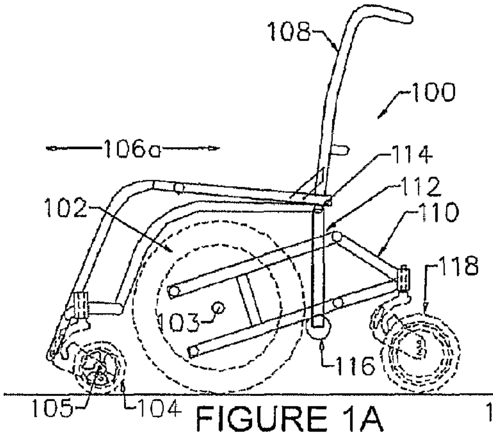
FIGS. 1*a* to 1*d* illustrate a wheelchair in accordance with a first embodiment of the invention.

FIG. 1 illustrates a dual mode wheelchair 100 in accordance with a first embodiment of the present invention. Wheelchair 100 comprises two rear drive wheels 102 mounted to sub-frame 110 on a rear axis 103, and two fore castor wheels 104 mounted to seat frame 108 on a fore axis 105. A distance between the rear axis 103 and fore axis 105 defines the wheelbase 106 of the wheelchair 100. Seat frame 108 is movably mounted to sub-frame 110 by a pivot arm 112 having a pivotal connection 114 to seat frame 108 and a pivotal connection 116 to sub-frame 110. A fore portion of seat frame 108 is secured to sub-frame 110 by damped support means (not shown in FIG. 1). Sub-frame 110 further comprises a rear castor wheel 118, positioned rearward of the rear drive wheels 102 and, as shown in FIGS. 1*c* and 1*d*, positioned substantially centrally between the sides of the wheelchair 100. The provision of rear castor wheel 118 in the present embodiment provides for the torque from the drive wheels 102 to be transmitted to the rear castor wheel 118 rather than to the seat frame 108. Thus, the castor wheel 118 decreases the tendency for rearward tipovers of the wheelchair 100, particularly in the travel mode.

FIG. 1*a* shows wheelchair 100 in a manoeuvrable mode, in which wheelbase 106*a* is short. In the manoeuvrable mode, seat frame 108 is held high by the pivot arm 112 standing upright, such that seat frame 108 provides for a user to be in an upright seated position, and a centre of gravity of wheelchair 100 when occupied is relatively high providing for an occupant to work at a desk, sit at a dinner table, or the like. FIG. 1*c* is a plan view illustrating the footprints of wheels 102, 104 and 118, and shows the turning footprint 140 of wheelchair 100 required when wheelchair 100 is in the manoeuvrable mode. As can be seen the footprint 140 is defined by the relative positions of the wheels 102, 104 and 108, and wheelchair 100 requires a small footprint 140 when in the manoeuvrable mode.

Figure 1B:
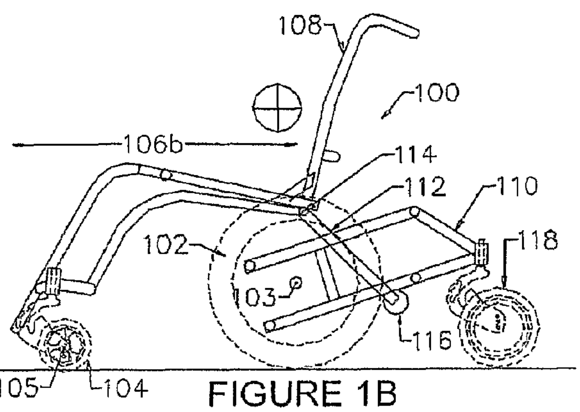
Figure 1C:
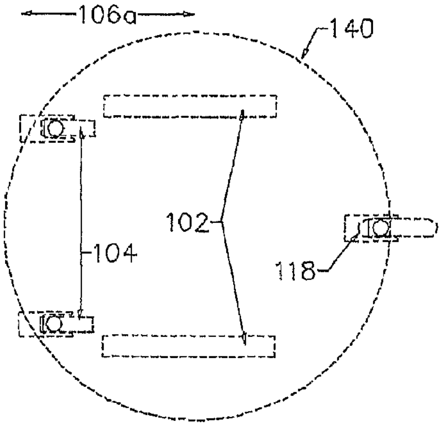
Figure 1D:
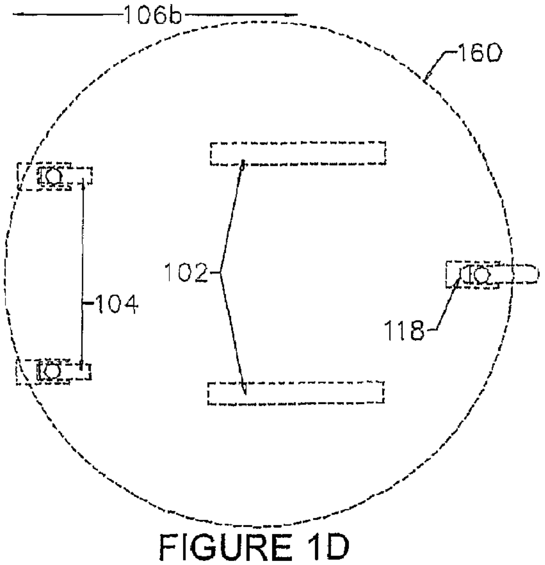

FIG. 1*b* shows wheelchair 100 in a travel mode, in which wheelbase 106*b* is lengthened sufficiently to provide for directional stability for travel of the wheelchair 100 at speed. In the travel mode, pivot arm 112 extends forwardly and thus holds the rear of seat frame 108 in a lower position in the travel mode than in the manoeuvrable mode, thus lowering a centre of gravity of the wheelchair 100 when occupied and thus improving stability of the wheelchair 100. As seat frame 108 is substantially rigid, a fore portion of seat frame 108 remains at a similar height in both the travel mode and the manoeuvrable mode, and so the seat frame 108 provides a reclined seating position in the travel mode as illustrated in FIG. 1*b*. Such a reclined seating position is advantageous in reducing the likelihood of an occupant being thrown forward out of the wheelchair 100. Further, by increasing a percentage of the weight of the user applied to a backrest portion of the seat frame 108, the reclined seating position increases frictional resistance to a user being thrown laterally from the wheelchair 100. FIG. 1*d* is a plan view illustrating the footprint 160 required for turning of the wheelchair 100 in the travel mode, footprint 160 being significantly larger than the footprint 140 required for turning of the wheelchair 100 in the manoeuvrable mode. Such a large wheelbase 160*b* provides for improved stability of the wheelchair 100 when in the travel mode.

Movement of pivot arm 112 between the manoeuvrable mode and the travel mode may be effected by a motor (not shown) or manually by a hand operated threaded winding mechanism (not shown).

Figure 2A:
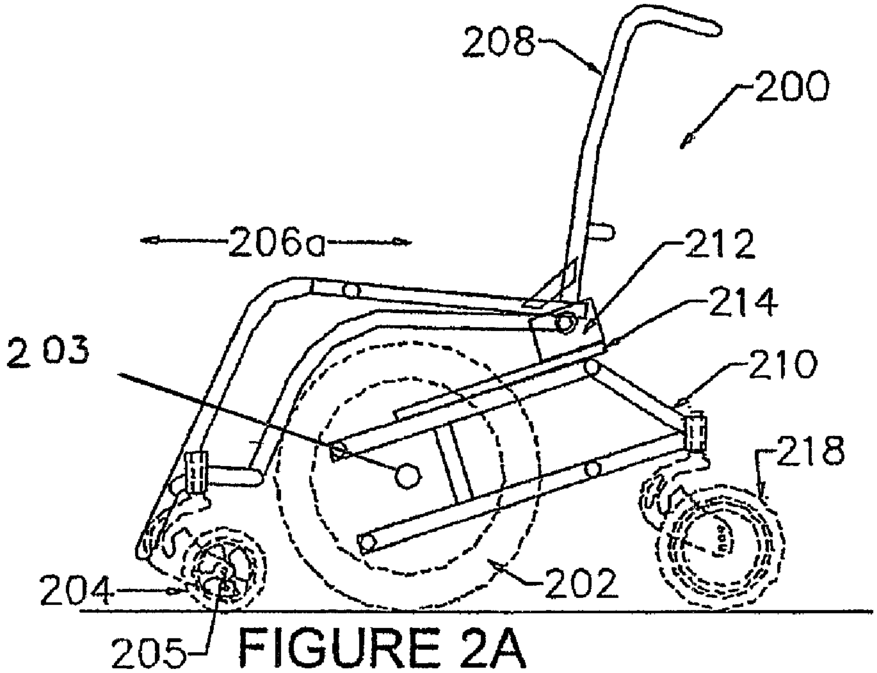
FIGS. 2*a* and 2*b* illustrate a wheelchair in accordance with a second embodiment of the invention.
Figure 2B:
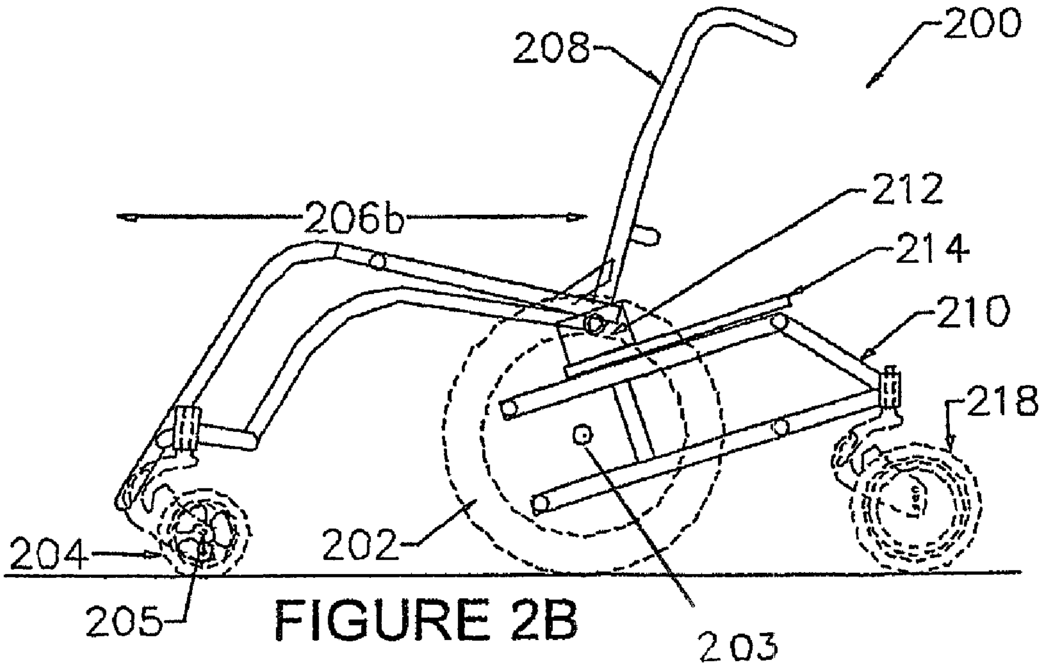

FIG. 2 illustrates a wheelchair 200 in accordance with a second embodiment of the present invention. Wheelchair 200 comprises rear drive wheels 202 mounted to a sub-frame 210 on a rear axis 203. Wheelchair 200 further comprises fore castor wheels 204 mounted to a seat frame 208 on a fore axis 205, and a rear guide castor wheel 218 mounted on sub-frame 210. A sliding mount attachment 212 of seat frame 208 is movably mounted to a sliding mount 214 of sub-frame 210. The sliding mount 214 is angled thus providing for the sliding mount attachment 212 of the seat frame 208 to travel forwardly and downwardly when the wheelbase 206 is lengthened from the manoeuvrable mode of FIG. 2*a* (206*a*) to the travel mode of FIG. 2*b* (206*b*). Again, a fore portion of seat frame 208 is secured to sub-frame 210 by damped support means (not shown in FIG. 2).

Movement of sliding mount attachment 212 between the manoeuvrable mode and the travel mode may be effected by a motor (not shown) or manually by a hand operated threaded winding mechanism (not shown).

Figure 3C:
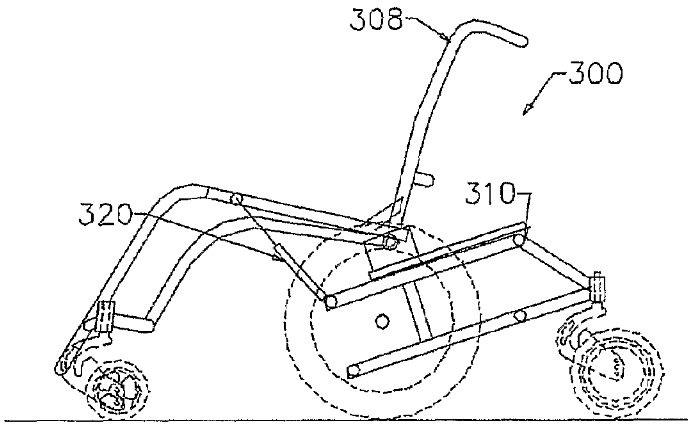
FIGS. 3*a* to 3*c* illustrate damped support means suitable for application in the first and second embodiments.
Figure 3B:
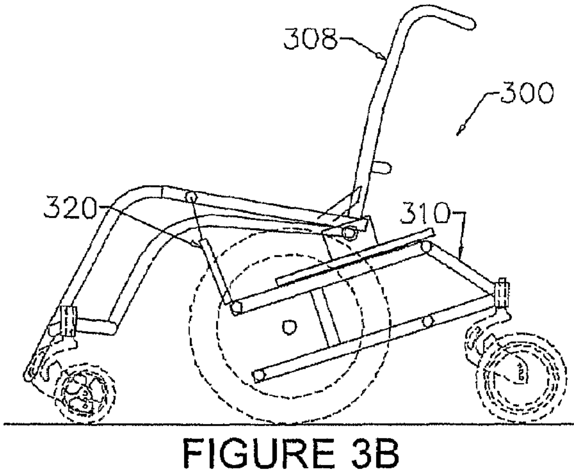
Figure 3A:
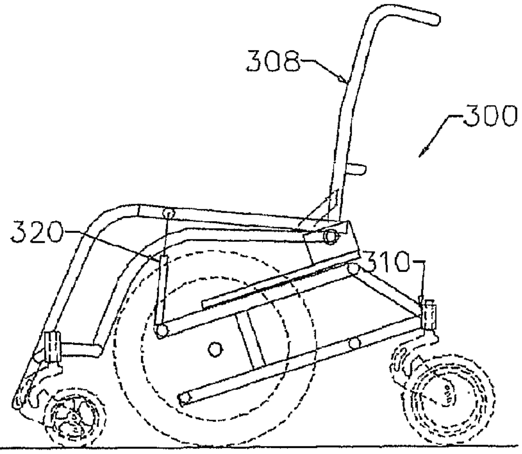

FIG. 3*a* illustrates a wheelchair 300 in which a fore portion of seat frame 308 is secured to sub-frame 310 by appropriate damped support means 320. Such a configuration may be applied in either embodiment shown in FIGS. 1 and 2. As can be seen in FIG. 3, a fore portion of seat frame 308 is maintained a distance off the ground which is roughly the same for both the manoeuvrable mode of FIG. 3*a* and the travel mode of FIG. 3*c*. FIG. 3*b* illustrates positioning of the sliding mount at an intermediate set-point so as to provide a range of seat tilt and frame extension allowing for driver preference. The use of damped support means 320 provides for some articulation of the wheelchair 300 to enable travel over kerbs, and uneven ground.

Figure 4C:
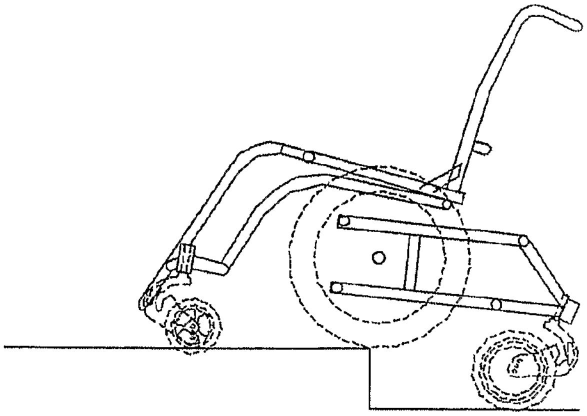
FIGS. 4*a* to 4*c* illustrate articulation of a wheelchair suitable for use in conjunction with the first and second embodiments.
Figure 4A:
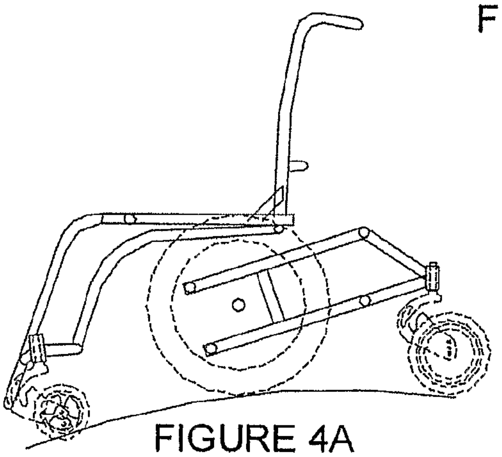
Figure 4B:
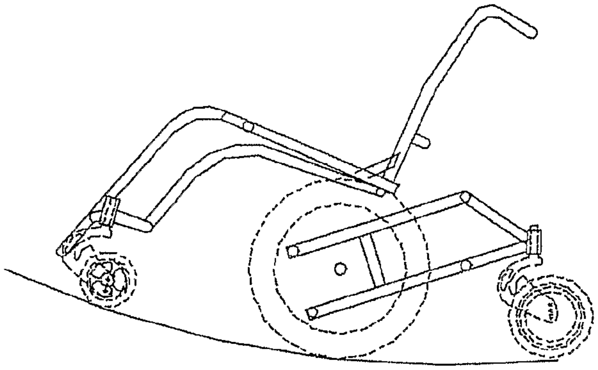

FIGS. 4*a* to 4*c* illustrate an articulated wheelchair frame and the ability of such a frame to maintain contact of all wheels on the ground even over uneven terrain. Thus, stability is maintained over convex surfaces (FIG. 4*a*) or concave surfaces (FIG. 4*b*), and traction of the drive wheels can be maintained. Further, this allows for the torque from the drive wheels to be transmitted to the rear castor rather than the front frame in the travel mode, thus decreasing the tendency for rearward tipovers. Thus, mainly forward and back motion is transmitted to the seat frame, whereas little or no torque is transmitted to the seat frame from the drive wheels. Still further, as illustrated in FIG. 4*c*, when the wheelchair of the present invention passes over a kerb, minimal seat tilt occurs as a result of such an articulated frame. Such articulation may be implemented in conjunction with the wheelchair of FIG. 1 or the wheelchair of FIG. 2.

Figure 5:
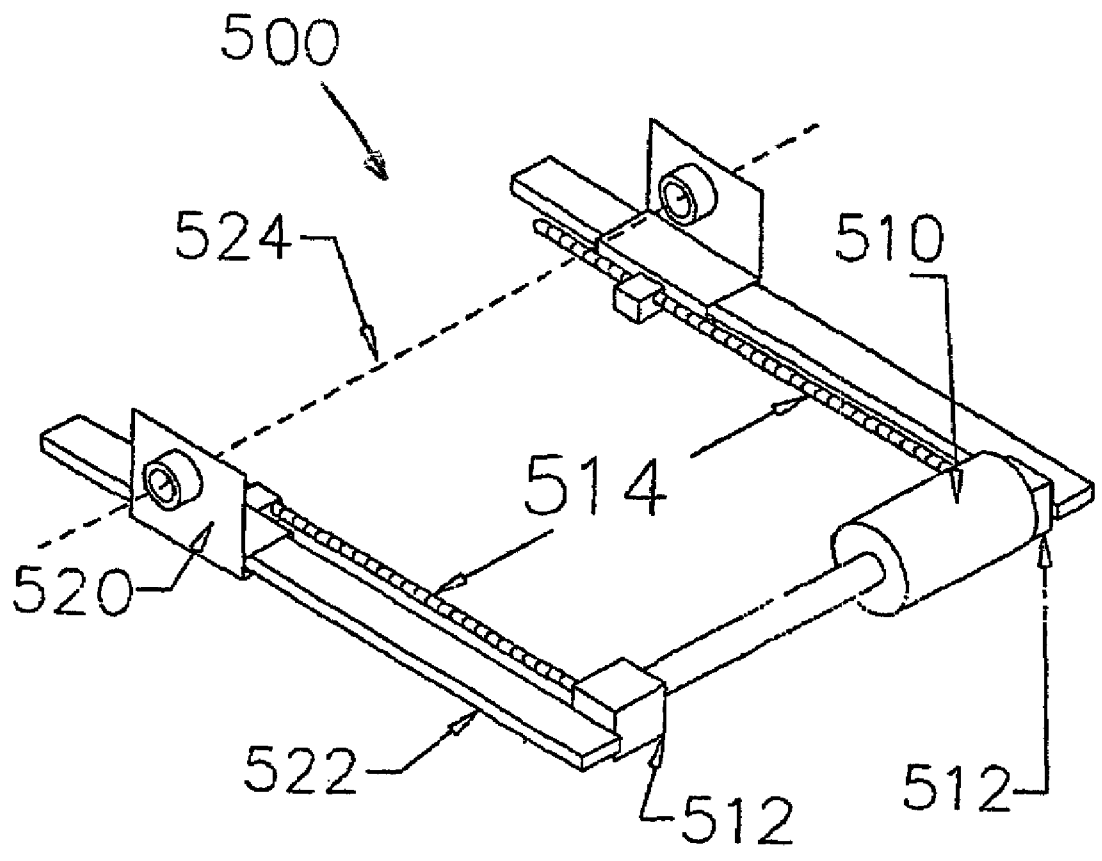
FIG. 5 illustrates a motorised actuation mechanism for adjusting the wheelchair of the first or second embodiment between a travel mode and an indoor mode.

FIG. 5 illustrates a motorised actuation mechanism 500 for changing a wheelchair between an indoor (manoeuvrable) mode and a travel mode. The mechanism 500 comprises a motor 510 and 90 degree gear drives 512 which pass the drive force to worm drives 514. The worm drives 514 move a sliding mount attachment 520 of a seat frame (not shown) along slide rails 522 of a sub-frame (not shown), so as to effect transition of the wheelchair from an indoor (manoeuvrable) mode to a travel mode. Also shown is a pivot axis 524 of the seat frame mounted on the sliding mount attachment 520. As the sliding mount attachment 520 and pivot axis 524 are driven along the slide rail 522, pivoting of the seat frame may occur about the pivot axis 524 to effect transition of the seat between a low, stable reclined position in the travel mode and a high upright seated position in the indoor (manoeuvrable) mode. The pivot axis 524 further permits articulation of the wheelchair frame to permit travel over uneven terrain while maintaining contact of all wheels upon the ground.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A dual mode wheelchair comprising:

at least one fore wheel mounted on a fore axis and at least one rear wheel mounted on a rear axis, a distance between the fore axis and the rear axis defining a wheelbase of the wheelchair;

wherein the wheelbase is alterable between a short wheelbase providing a maneuverable mode of the wheelchair and a long wheelbase providing a travel mode of the wheelchair;

wherein a center of gravity of the wheelchair when occupied in the maneuverable mode is higher than a center of gravity of the wheelchair when occupied in the travel mode;

the dual mode wheelchair further comprising a sub-frame upon which the at least one rear wheel is mounted, and a seat frame upon which the at least one fore wheel is mounted;

wherein the seat frame is movably mounted to the sub-frame to provide for alteration of the wheelbase between the maneuverable mode and the travel mode; and wherein the movable mounting of the seat frame to the sub-frame comprises a sliding mount.

2. The dual mode wheelchair as claimed in claim 1, wherein the wheelchair provides a reclined seating position in the travel mode, and an upright seating position in the maneuverable mode.

3. The dual mode wheelchair as claimed in claim 1, further providing for operation of the wheelchair in at least one intermediate position between the maneuverable mode and the travel mode.

4. The dual mode wheelchair as claimed in claim 1, wherein a sliding mount attachment of the seat frame is proximal to a rear of the seat frame, and wherein the sliding mount provides for the sliding mount attachment of the seat frame to travel forwardly and downwardly when the wheelbase is lengthened from the maneuverable mode to the travel mode.

5. The dual mode wheelchair as claimed in claim 4, wherein the rear of the seat frame is lower relative to a fore portion of the seat frame when in the travel mode, providing a reclined seating position of the wheelchair in the travel mode.

6. A dual mode wheelchair comprising:

at least one fore wheel mounted on a fore axis and at least one rear wheel mounted on a rear axis, a distance between the fore axis and the rear axis defining a wheelbase of the wheelchair;

at least one guide wheel rearward of the at least one rear wheel;

wherein the wheelbase is alterable between a short wheelbase providing a maneuverable mode of the wheelchair and a long wheelbase providing a travel mode of the wheelchair;

wherein a center of gravity of the wheelchair when occupied in the maneuverable mode is higher than a center of gravity of the wheelchair when occupied in the travel mode.

7. The dual mode wheelchair as claimed in claim 6 wherein the at least one guide wheel includes one guide wheel, and wherein the guide wheel is positioned substantially centrally between the sides of the wheelchair.

8. The dual mode wheelchair as claimed in claim 6, wherein the wheelchair is articulated.

9. A dual mode wheelchair frame comprising:

a first frame portion for mounting at least one fore wheel on a fore axis; and a second frame portion for mounting at least one rear wheel on a rear axis, a distance between the fore axis and the rear axis defining a wheelbase of the dual mode wheelchair frame;

wherein the first frame portion is movably mounted to the second frame portion to provide for alteration between a short wheelbase providing a maneuverable mode of the wheelchair frame and a long wheelbase providing a travel mode of the wheelchair frame; and wherein a center of gravity of the wheelchair frame when occupied in the maneuverable mode is higher than a center of gravity of the wheelchair frame when occupied in the travel mode;

wherein the movable mounting of the first frame portion to the second frame portion comprises a sliding mount.

10. The dual mode wheelchair frame as claimed in claim 9, wherein the wheelchair frame provides a reclined seating position in the travel mode, and an upright seating position in the maneuverable mode.

11. The dual mode wheelchair frame as claimed in claim 9, further providing for operation of the wheelchair frame in at least one intermediate position between the maneuverable mode and the travel mode.

12. The dual mode wheelchair frame as claimed in claim 9, wherein a sliding mount attachment of the first frame portion is proximal to a rear of the first frame portion, and wherein the sliding mount provides for the sliding mount attachment of the first frame portion to travel forwardly and downwardly when the wheelbase is lengthened from the maneuverable mode to the travel mode.

13. The dual mode wheelchair frame as claimed in claim 12, wherein the rear of the first frame portion is lower relative to a fore portion of the first frame portion when in the travel mode, providing a reclined seating position of the wheelchair frame in the travel mode.

14. A dual mode wheelchair frame comprising:

a first frame portion for mounting at least one fore wheel on a fore axis; and a second frame portion for mounting at least one rear wheel on a rear axis, a distance between the fore axis and the rear axis defining a wheelbase of the dual mode wheelchair frame;

wherein the first frame portion is movably mounted to the second frame portion to provide for alteration between a short wheelbase providing a maneuverable mode of the wheelchair frame and a long wheelbase providing a travel mode of the wheelchair frame; and wherein a center of gravity of the wheelchair frame when occupied in the maneuverable mode is higher than a center of gravity of the wheelchair frame when occupied in the travel mode; and wherein the second frame portion further comprises at least one mount for a guide wheel rearward of the at least one rear wheel.

15. The dual mode wheelchair frame as claimed in claim 14, wherein the wheelchair frame is articulated.

* * * * *